US012650872B2

(12) United States Patent  
Johnson et al.

(10) Patent No.: US 12,650,872 B2  
(45) Date of Patent: Jun. 9, 2026

(54) HYPERVISOR-ASSISTED SCALABLE DISTRIBUTED SYSTEMS

(71) Applicant: Hewlett Packard Enterprise Development LP, Spring, TX (US)

(72) Inventors: Brian J. Johnson, Rosemount, MN (US); Frank R. Dropps, Annandale, MN (US); Derek S. Schumacher, Naperville, IL (US); Thomas Edward McGee, Eau Claire, WI (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 512 days.

(21) Appl. No.: 18/133,895

(22) Filed: Apr. 12, 2023

(65) Prior Publication Data

US 2024/0345857 A1      Oct. 17, 2024

(51) Int. Cl.  
*G06F 9/455* (2018.01)

(52) U.S. Cl.  
CPC .................... *G06F 9/45558* (2013.01); *G06F 2009/45579* (2013.01); *G06F 2009/45583* (2013.01)

(58) Field of Classification Search  
CPC ....... G06F 9/45558; G06F 2009/45579; G06F 2009/45583  
See application file for complete search history.

(56) References Cited

U.S. PATENT DOCUMENTS

| | | | |
|---|---|---|---|
| 9,015,706 B2 | 4/2015 | Conover et al. | |
| 9,489,519 B2 | 11/2016 | Feroz et al. | |
| 9,904,527 B1 | 2/2018 | Miller et al. | |
| 10,127,068 B2 | 11/2018 | Liguori et al. | |
| 10,303,879 B1 | 5/2019 | Potlapally et al. | |
| 10,318,311 B2 | 6/2019 | Liguori et al. | |
| 10,423,790 B2 | 9/2019 | Patil et al. | |
| 10,725,833 B2 | 7/2020 | Qi et al. | |
| 11,126,575 B1 | 9/2021 | Aslanidis et al. | |
| 2006/0136765 A1* | 6/2006 | Poisner | G06F 11/1441 713/323 |
| 2014/0280956 A1* | 9/2014 | Shu | H04L 41/0895 709/226 |
| 2016/0132411 A1* | 5/2016 | Jolad | G06F 11/2028 714/6.3 |
| 2018/0341506 A1* | 11/2018 | Kolesnik | H04L 41/08 |
| 2021/0149562 A1* | 5/2021 | Epping | G06F 9/45558 |
| 2021/0209052 A1 | 7/2021 | Chen et al. | |

* cited by examiner

*Primary Examiner* — Michael W Ayers  
(74) *Attorney, Agent, or Firm* — Buchanan Ingersoll & Rooney

(57) ABSTRACT

A first hypervisor running on a first processor cluster is provided. During operation, the first hypervisor can determine a first set of processing nodes and a first memory unit of the first processor cluster in response to the booting up of a first Basic Input/Output System (BIOS) of the first processor cluster. The first hypervisor can discover a second hypervisor running on a second processor cluster comprising a second set of processing nodes and a second memory unit. The first hypervisor can operate, with the second hypervisor, a distributed system comprising the first and second sets of processing nodes and the first and second memory units. The first hypervisor can then operate, with the second hypervisor, a global virtual machine on the distributed system. The virtual memory space of the global virtual machine can be mapped to respective memory spaces of the first and second processor clusters.

20 Claims, 12 Drawing Sheets

HYPERVISOR-ASSISTED SCALABLE DISTRIBUTED SYSTEMS

BACKGROUND

Field

The present disclosure relates to distributed computing infrastructure. More specifically, the present disclosure relates to a method and system for efficiently incorporating multiple distributed systems in a scalable way.

BRIEF DESCRIPTION OF THE FIGURES

In the figures, like reference numerals refer to the same figure elements.

DETAILED DESCRIPTION

Figure 1A:
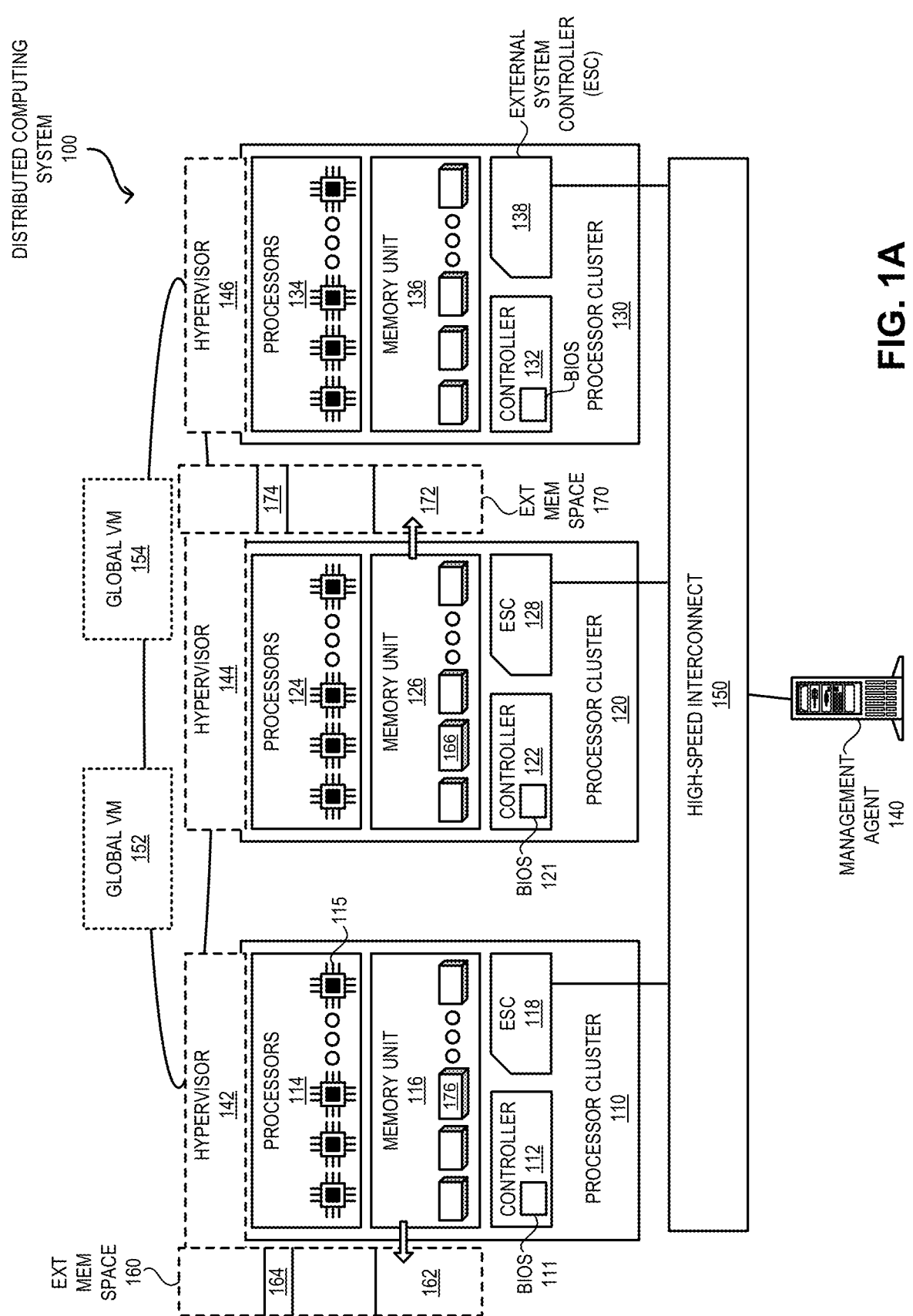
FIG. 1A illustrates an example of a hypervisor-assisted scalable distributed system with multiple processor clusters, in accordance with an aspect of the present application.

In high-performance computing (HPC), a system can support a processor cluster that includes a set of processors (e.g., central processing units (CPUs)) and a memory unit. The processor cluster can also be referred to as a cluster of multiprocessors (clump). A cluster may include standard processor sockets (for accommodating the compute cores), memory, and input/output (I/O) components. A cluster typically consists of two or four coherently-connected sockets, but the number can be higher.

Multiple clusters can be coupled to each other using a high-capacity interconnect network to form a large-scale distributed computing system (DCS). Typically, the memory units of a respective cluster can be combined into a shared memory pool for the DCS. To support the interconnection among the clusters, a respective cluster can support an external system controller (ESC), which can be a component installed on a respective cluster, such as an external node controller (XNC). The ESC can also include a set of Compute Express Links (CXLs) to an external shared memory unit and may support I/O Hub (IOH). The ESCs in a DCS, in conjunction with each other, can operate the corresponding clusters as a single, coherent shared-memory computer system with a single system image (SSI) and allow the DCS to run a standard operating system (OS) or a hypervisor.

The aspects described herein solve the problem of efficiently forming a DCS with a plurality of processor clusters (or clumps) by (i) deploying a hypervisor on a respective cluster of the DCS; (ii) allowing the hypervisor to map remote memory segments to a local memory space, thereby allowing a local processor to access memory spaces of remote clusters; and (iii) converting the access to a mapped memory segment to a corresponding remote memory segment based on communication among the hypervisors. As a result, the DCS can deploy a global virtual machine (VM) that may maintain a contiguous virtual memory address space mapped to the memory spaces of multiple clusters.

With existing technologies, a DCS can be formed as a large-scale shared memory computing system with multiple processor clusters, such as clumps. A cluster can be formed by a plurality of processors and a memory unit, which can include one or more memory devices (e.g., dual in-line memory modules (DIMMs)). The physical address space of the memory unit may start with an initial address (e.g., an address of 0), which can correspond to the initial (or first) memory block of the memory unit. A subsequent address can then correspond to the subsequent memory block. The components in a cluster can be interconnected using a vendor-provided mechanism, which may typically support a limited number of devices. To scale up, multiple clusters can be interconnected using ESCs. The memory units of individual clusters can form the shared memory space for the DCS. Because an ESC can be a hardware-based solution, it can be challenging to support some features in the DCS. Furthermore, if the vendors for the cluster and an ESC are different, the ESC may not support changes to the clusters (e.g., due to version changes or unpublished modifications).

In a DCS, a respective cluster may operate using the same global address space for distributed accessibility. Consequently, only one of the clusters of the DCS may map the local physical address space to the corresponding global addresses where the local physical address of 0 is also mapped to the global address of 0. The respective address spaces of all other clusters can then be mapped to the higher addresses of the global address space, which can be different from the local physical addresses. Typically, a cluster boots up using its basic I/O system (BIOS). However, the BIOS may have limited capability, such as a limited address space (e.g., a 32-bit space). As a result, during the booting-up process of the other clusters, it can be challenging to run the BIOS with its limited address space. Consequently, a DCS cannot be efficiently booted up with some of the services that may require access to the shared memory space. Furthermore, a respective ESC may become complex to support the global memory space, thereby increasing the cost of an ESC.

To solve this problem, upon independently booting up, a respective cluster can run a hypervisor that can facilitate the resource management for the cluster. For example, the hypervisor can provide access to local resources, such as the local memory space. Based on accessing each other's resources, hypervisors can facilitate, in conjunction with each other, a global resource space. The hypervisors can communicate with each other using ESCs. Because the hypervisor of a cluster can be launched after the cluster boots up, the BIOS of the cluster can initiate the cluster independently (i.e., without considering its presence in the DCS).

Upon launching, a respective hypervisor can configure the local ESC, which can generate an extended memory space (e.g., in the software as a logical space). The extended memory space can be a localized version of the global memory space. A respective memory address of the extended memory space can be referred to as a cluster memory address. The physical memory space of the local memory unit can then correspond to the lower cluster addresses of the extended memory space. Consequently, at each cluster of the DCS, the local physical address space can correspond to the corresponding cluster addresses where the local physical address of 0 is also mapped to the cluster address of 0. If a local processor needs to access a remote memory segment of another cluster, the hypervisor can map the physical memory space of the remote memory segment into an arbitrary segment of the extended memory space beyond the local physical space (e.g., at higher cluster addresses). The processor can access a local cluster memory address to access a memory block of the remote memory segment. A memory block can be a unit of memory that can be identified by a memory address. Hence, a respective memory block can be associated with a unique memory address of a corresponding memory space.

One or more global VMs can then operate on the DCS. The hypervisors can allocate computing and memory resources for a respective global VM. For example, a global VM can run on the processors of one or more clusters while using the memory of the same cluster or a different set of clusters. Accordingly, the virtual memory space of a global VM can be mapped to the extended memory space of one or more clusters. In this way, a global VM can run on a plurality of hypervisors. The hypervisors can run a resource allocation mechanism to select which computing and memory resources to be allocated to a global VM. Examples of the resource allocation mechanism can include, but are not limited to, round-robin allocation, load-based allocation, and pre-configured allocation.

Based on the physical memory allocation for the global VM, the virtual memory space of the global VM can be mapped to the extended memory spaces of one or more clusters. However, cluster memory addresses of the extended memory space of a cluster can include the physical memory addresses of the local cluster as well as the mapped addresses of the memory of the remote clusters. Hence, the cluster can facilitate a two-level memory mapping. The first memory mapping, which can be facilitated by the hypervisor, can be between the virtual memory space of a global VM and the extended memory spaces of corresponding clusters. The second memory mapping, which can be facilitated by the ESC, can be between the extended memory space of a cluster to the physical memory of the local and remote clusters. Consequently, the hypervisors can allow individual clusters to boot up without global mapping and subsequently generate the memory mappings to support the global VMs.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component coupling a network of CXLs, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of a hypervisor-assisted scalable distributed system with multiple processor clusters, in accordance with an aspect of the present application. A plurality of processor clusters 110, 120, and 130 can be coupled to each other using a high-speed interconnect network 150 to form a large-scale DCS 100. Cluster 110 can include a plurality of processors 114, a memory unit 116, which can include one or more memory devices (e.g., DIMM units). In other words, cluster 110 may include standard processor sockets, memory, and I/O components. Cluster 110 may be packaged in a standalone chassis, similar to a standard 2u or 4u server, or as a blade server. The components in cluster 110 can be interconnected using a vendor-provided controller 112. Similarly, cluster 120 can include a controller 122, a plurality of processors 124, and a memory unit 126; and cluster 130 can include a controller 132, a plurality of processors 134, and a memory unit 136.

To support the interconnection among themselves, clusters 110, 120, and 130 can support ESCs 118, 128, and 138, respectively. An ESC, such as ESC 118, can be a component that can be installed on cluster 110, such as an XNC. The ESC can also include a set of CXLs to an external shared memory unit and may support an IOH. ESCs 118, 128, and 138, in conjunction with each other, can operate the clusters 110, 120, and 130, respectively, as a single, coherent shared-memory computer system (i.e., DCS 100) with an SSI. ESCs 118, 128, and 138 can also allow DCS 100 to run a standard OS or a hypervisor. In other words, to scale up, clusters 110, 120, and 130 can be interconnected using ESCs 118, 128, and 138, respectively, to form DCS 100.

With existing technologies, processors 114 and memory unit 116 can be interconnected using vendor-provided controller 112 to operate as a unified system. However, controller 112 may typically support a limited number of devices. To address this issue, cluster 110 can be interconnected with clusters 120 and 130, thereby scaling up to form DCS 100. Upon the formation of DCS 100, memory units 116, 126, and 136 can form a shared global memory space for DCS 100. Typically, ESCs 118, 128, and 138 can map each other's memory to form the shared global memory space. Each of clusters 110, 120, and 130 may operate using the same global address space for distributed accessibility. Because only one of the clusters 110, 120, and 130 may map the local physical address space to the corresponding global addresses, facilitating the global memory space can increase the complexity of ESCs 118, 128, and 138.

For example, only one of clusters 110, 120, and 130, such as cluster 120, may map the local physical address space to the corresponding global addresses where the local physical address of 0 is also mapped to the global address of 0. The respective address spaces of clusters 110 and 130 can then be mapped to the higher addresses of the global address space, which can be different from the local physical addresses. When cluster 110 boots up, cluster 110 can rely on BIOS 111, which may be incorporated in controller 112. However, BIOS 111 may have limited capability, such as a limited memory address space (e.g., a 32-bit space). During the booting-up process of cluster 110, it can be challenging to run BIOS 111 with the limited memory address space. Consequently, DCS 100 cannot be efficiently booted up with some of the services that may require access to the shared memory space. Furthermore, each of ESCs 118, 128, and 138 may become complex to support the global memory space. Hence, the cost of ESCs 118, 128, and 138 can be significant. Furthermore, if the vendors for cluster 110 and ESC 118 are different, ESC 118 may not support changes to cluster 110 (e.g., due to version changes or unpublished modifications).

To solve this problem, upon independently booting up, cluster 110 can run hypervisor 142, which can facilitate the resource management for cluster 110. Similarly, clusters 120 and 130 can run hypervisors 144 and 146, respectively, for local resource management. Hypervisor 142 may configure ESC 118, which can then provide access to local resources, such as the memory space of memory unit 116, to ESCs 128 and 138. Based on accessing each other's resources, hypervisors 142, 144, and 148 can facilitate, in conjunction with each other, a global resource space for DCS 100. Hypervisors 142, 144, and 148 can communicate with each other using ESCs 118, 128, and 138, respectively, via interconnect 150. Because hypervisor 142 can be launched after cluster 110 boots up, BIOS 111 can first initialize cluster 110 independently without considering its presence in DCS 100. As a result, BIOS 111 and ESC 118 can be significantly simplified.

Upon launching, ESC 118 can generate an extended memory space 160 (e.g., a logical space) for cluster 110. In the same way, ESC 128 can generate an extended memory space 170 for cluster 120. Extended memory spaces 160 and 170 can be the localized versions of the global memory space of DCS 100 on clusters 110 and 120, respectively. BIOS 111 can configure ESC 118 to map the physical memory space of memory unit 116 into segment 162 of extended memory space 160 (e.g., at lower cluster addresses). If a processor in processors 114, such as processor 115, needs to access a remote memory segment 166 in memory unit 126 (e.g., for issuing a transaction on the virtual memory space of global VM 152), hypervisor 142 can configure ESC 118 to map the physical memory addresses of memory segment 166 into another segment 164 of extended memory space 160 (e.g., at higher cluster addresses). Processor 115 can then access a local cluster memory address corresponding to segment 164 to access or update a memory block of memory segment 166. In the same way, BIOS 121 can configure ESC 128 to map the physical memory space of memory unit 126 into segment 172 of extended memory space 170. If a processor in processors 124 needs to access a remote memory segment 176 in memory unit 116, hypervisor 144 can configure ESC 128 to map the physical memory addresses of memory segment 176 into another segment 174 of extended memory space 170.

Global VMs 152 and 154 can then operate on DCS 100. Hypervisors 142, 144, and 146 can allocate computing and memory resources for global VMs 152 and 154. For example, global VM 152 can run on the processors of clusters 110 and 120 while using the memory unit of a single cluster, such as memory unit 116, or the memory units of a set of clusters, such as memory units 116 and 126. Accordingly, the virtual memory space of global VM 152 can be mapped to the extended memory space of clusters 110 and 120. In this way, global VM 152 can run on a plurality of hypervisors. A management agent 140 can determine which resources to include in each of global VMs 152 and 154.

Hypervisors 142, 144, and 146 can also run a resource allocation mechanism to select which computing and memory resources to be allocated to global VM 152. Examples of the resource allocation mechanism can include, but are not limited to, round-robin allocation, load-based allocation, and pre-configured allocation. Hypervisors 142, 144, and 146 can pass input from or output to respective I/O devices through from the underlying hardware to global VMs 152 and 154. Furthermore, these hypervisors may emulate I/O devices for global VMs 152 and 154. Hypervisors 142, 144, and 146 can also assist with I/O interrupts and inter-processor interrupt delivery based on the virtualization capabilities of the respective processors and ESCs.

Based on the physical memory allocation for global VM 152, the virtual memory space of global VM 152 can be mapped to extended memory space 160. The cluster memory addresses of extended memory space 160 can then include the physical memory addresses of the local memory segments allocated to global VM 152 as well as the mapped addresses of the memory segments of cluster 120 allocated to global VM 152. Hence, cluster 110 can facilitate a two-level memory mapping. The first memory mapping can be between the virtual memory space of global VM 152 and a corresponding subset of extended memory space 160. The second memory mapping can be between the subset of extended memory space 160 to the physical memory of clusters 110 and 120. In this way, hypervisor 142 can allow cluster 110 to boot up without global mapping and subsequently generate the memory mappings to support global VM 152.

Here, ESC 118, BIOS 111, and hypervisor 142 can work in conjunction with each other to implement DCS 100. First, each of clusters 110, 120, and 130 can start to boot independently. For example, cluster 110 can boot up by running BIOS 111 with a low degree of involvement from ESC 118. BIOS 111 can initialize the local resources and map ESC 118 into extended memory space 160 as a proxy for the remote resources. Accordingly, cluster 110's memory can start at the standard location (e.g., the local physical address 0, which can also be the cluster address). Cluster 110 can then launch hypervisor 142, which can be stored in BIOS 111, loaded from a disk, or obtained via a network. Cluster 110 can use the Secure Boot mechanism to authenticate hypervisor 142 and avoid any malicious intrusion. Hypervisor 142 can then discover hypervisors 144 and 146 via interconnect 150. Hypervisor 142 may deploy a security handshake (e.g., a key-based or certificate-based validation) to authenticate hypervisors 144 and 146.

When global VM 152 is configured (e.g., from management agent 140), hypervisors 142, 144, and 146 via interconnect 150 determine which resources to allocate to global VM 152. Management agent 140 may indicate which resources to include in global VM 152. Hypervisors 142, 144, and 146 can then communicate with each other over interconnect 150 to determine an address map (e.g., a virtual memory space) encompassing the resources in global VM 152. Subsequently, hypervisor 142 ESC 118 can map remote resources required by global VM 152 into extended memory space 160. Furthermore, hypervisors 142, 144, and 146 can implement global VM 152's virtual address space on respective extended memory spaces, which can vary per cluster.

For example, hypervisor 142 can implement global VM 152's virtual address space on extended memory space 160. Similarly, hypervisor 144 can implement global VM 152's virtual address space on extended memory space 170. Because a cluster memory address can indicate local and remote physical addresses, when a virtual memory address of global VM 152 is accessed, the corresponding physical address of one cluster can be accessed even when the processor executing global VM 152 is on another cluster. Therefore, a reference to a given virtual memory address of global VM 152 from any cluster can be delivered to a single destination associated with the corresponding physical address even though it may traverse different cluster addresses on different clusters.

The bootstrap processor in global VM 152 can then start a customized and scalable VM BIOS (e.g., a software BIOS), which can include instructions controlling the boot-up process of global VM 152. The VM BIOS can allow global VM 152 to emulate a physical device by supporting the booting and I/O operations of global VM 152. The VM BIOS may not initialize a large set of hardware on a cluster. However, the VM BIOS may provide APIs for booting a guest OS on global VM 152. Examples of the APIs can include, but are not limited to, an Extensible Firmware Interface (EFI) memory map, Advanced Configuration and Power Interface (ACPI), and System Management BIOS (SMBIOS). The VM BIOS can then launch the guest OS, which can be selected by an operator of global VM 152, using standard mechanisms.

Figure 1B:
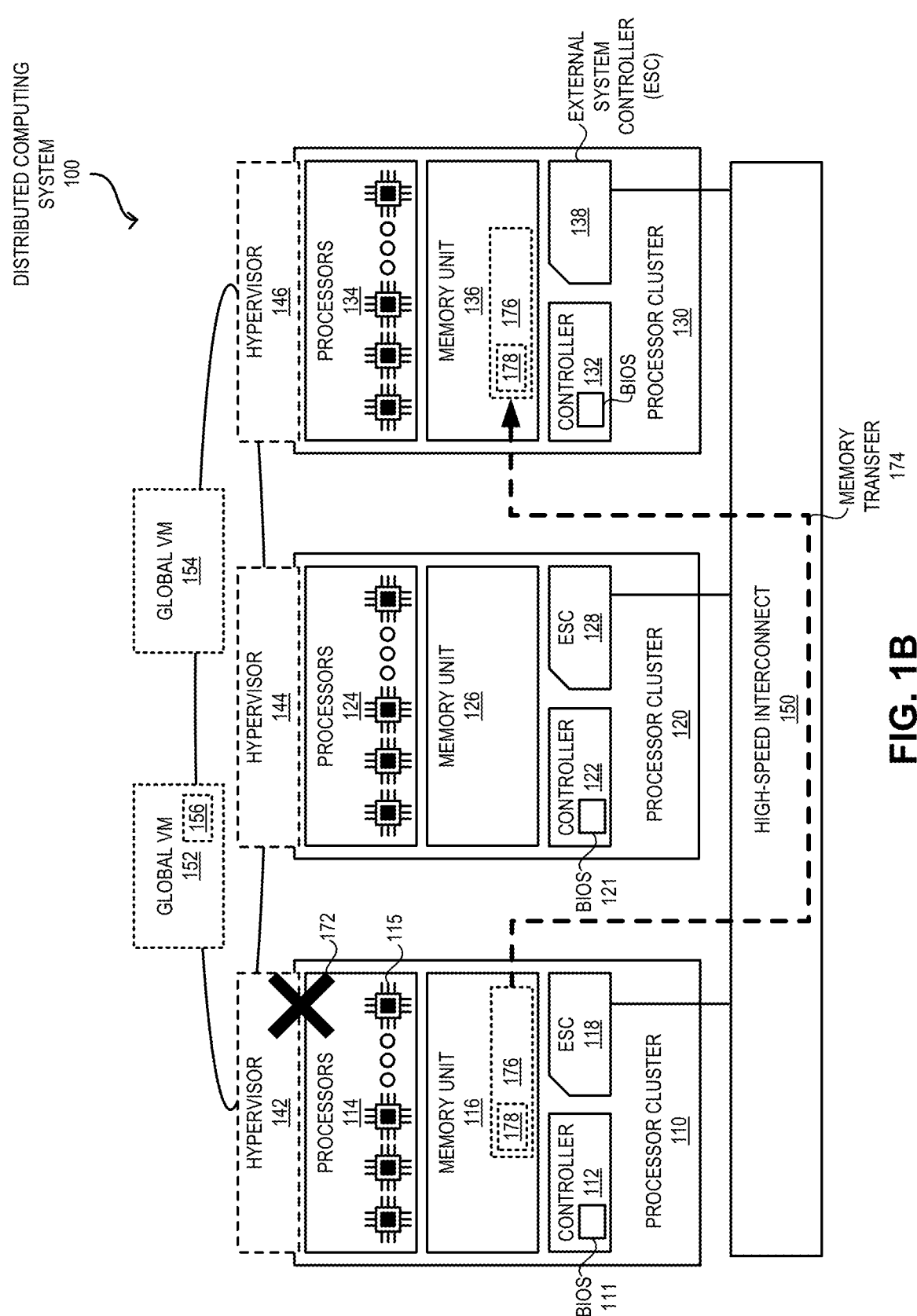
FIG. 1B illustrates an example of high availability in a hypervisor-assisted scalable distributed system with multiple processor clusters, in accordance with an aspect of the present application.

FIG. 1B illustrates an example of high availability in a hypervisor-assisted scalable distributed system with multiple processor clusters, in accordance with an aspect of the present application. Suppose that cluster 130 operates as a standby cluster in DCS 100. Upon booting up, clusters 110 and 120 can determine that they are to run global VMs 152 and 154. On the other hand, cluster 130 may remain idle. If a fault develops on cluster 110, the states can be transferred to cluster 130 so that the respective guest OS instances or applications of global VMs 152 and 154 are not interrupted. During operation, hypervisors 142, 144, and 146 can be notified that cluster 110 may need to migrate to cluster 130. The notification can be generated due to an imminent failure 172 detected by an analytics system monitoring the operations of DCS 100. An operator of DCS 100 may also request the migration.

Accordingly, hypervisor 142 can initiate a memory transfer 174 for pages 176 associated with global VMs 152 and 154 in memory unit 116. To do so, hypervisor 142 can request hypervisor 146 to receive memory transfer 174 and store the transferred pages 176 in memory unit 136. Hypervisor 142 may transfer one page at a time from memory unit 116 to memory unit 136. If a page 178 is associated with global VM 152, hypervisor 142 can make page 178 read-only to global VM 152 and may record that its transfer to cluster 130 is pending. Hypervisor 142 can then copy page

178 to cluster 130 using processors 134, an offload engine in a CPU socket, or ESCs 118 and 138.

If a guest processor 156 (or guest CPU) of global VM 152 tries to write to page 178 while it is being transferred, a page fault can occur. The page fault may remain visible to the local hypervisor. For example, if guest processor 156 executes on processor 124 of cluster 120, the page fault can be visible to hypervisor 144. Hypervisor 144 can then determine that page 178 is being transferred and pauses guest processor 156 until the transfer of page 178 is complete. Alternatively, hypervisor 144 may communicate with hypervisor 142 to request that page 178 be unlocked, and the transfer retried later. Unlike ordinary VM migration between standalone machines, page 178 may be read from memory units 116 and 136 simultaneously. As a result, VM 152 can run on clusters 110 and 130 concurrently, which facilitates DCS-level execution of global VMs.

Once page 178 is transferred, hypervisors 142, 144, and 146 can update their respective page tables to indicate that page 178 now resides on cluster 130 and is writable by global VM 152. If guest processor 156 has been paused, hypervisor 144 can restart guest processor 156 when the transfer of page 178 is complete. After a respective page in pages 176 is transferred to memory unit 136, hypervisor 142 can record the register states of each of processors 114 and send the states to hypervisor 146. Hypervisor 146 can then resume operations of processor 134 based on the register states obtained from hypervisor 142. Subsequently, hypervisors 142, 144, and 146 can transition the I/O resources provided by cluster 110 to an offline state. Cluster 110 can then be considered migrated to cluster 130.

When the migration is complete, cluster 110 can flush all remote references from its local data repositories and data structures (e.g., caches and directories, etc.), thereby disassociating itself from global VMs 152 and 154. Cluster 110 can then be powered off for service or replacement. When the issues are resolved, cluster 110 can be powered back on as the new standby cluster. In this way, hypervisors 142, 144, and 146 can facilitate high availability (e.g., a failover) in DCS 100. It should be noted that the high availability can also be provided in an active-active mode for individual global VMs where at least one standby cluster can be maintained for each global VM in DCS 100. For example, global VM 152 can run on clusters 110 and 120 while cluster 130 can remain on standby. On the other hand, global VM 154 can run on clusters 120 and 130 while cluster 110 can remain on standby.

Figure 2A:
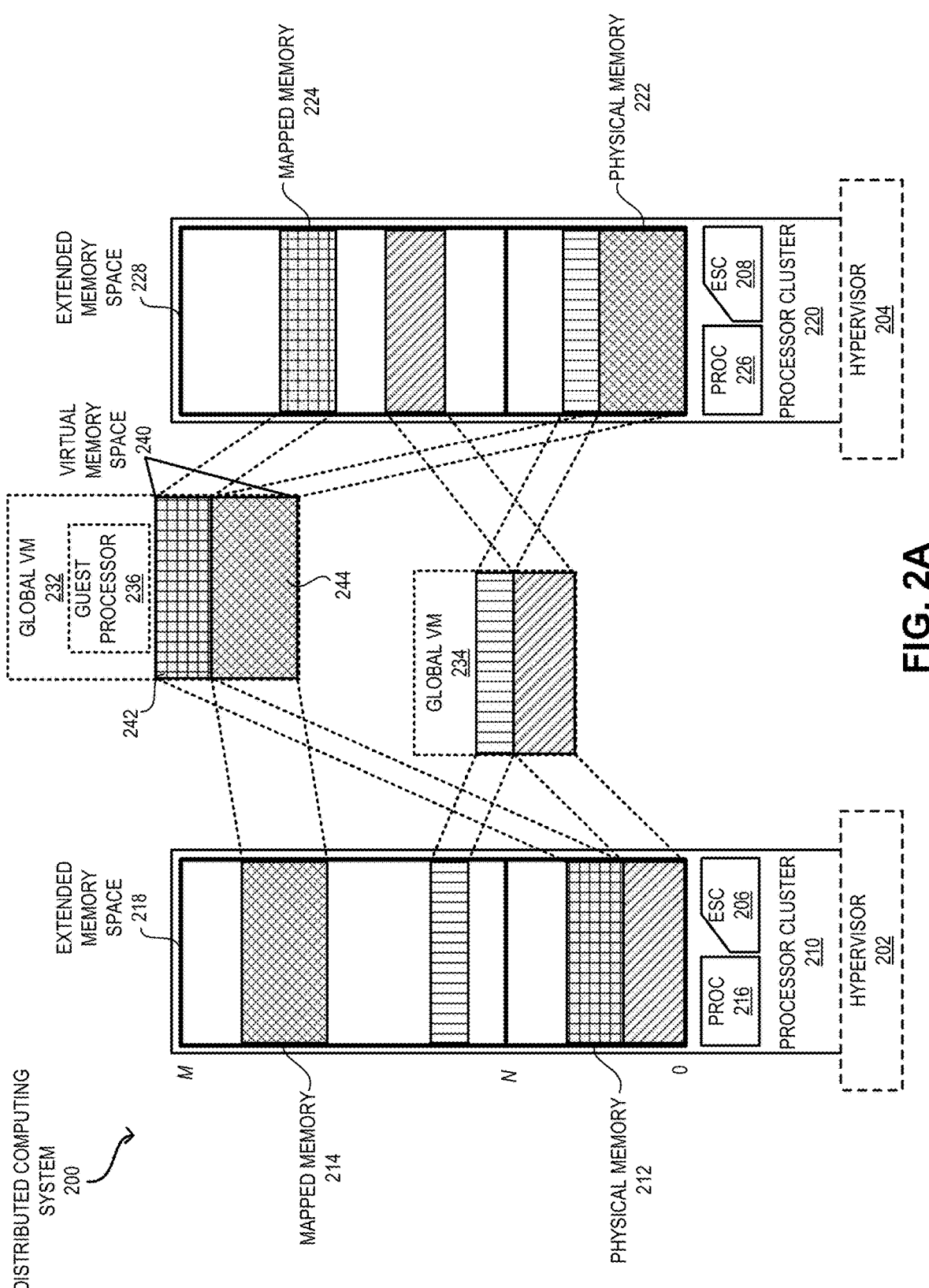
FIG. 2A illustrates an example of memory allocation to global virtual machines (VMs) running on a scalable distributed system, in accordance with an aspect of the present application.

FIG. 2A illustrates an example of memory allocation to global VMs running on a scalable distributed system, in accordance with an aspect of the present application. A plurality of processor clusters 210 and 220 can be coupled to each other to form a large-scale DCS 200. Cluster 210 can include ESC 206 and a plurality of processors, such as processor 216. Similarly, cluster 220 can include ESC 208 and a plurality of processors, such as processor 226. Upon independently booting up, clusters 210 and 220 can run hypervisors 202 and 204, respectively. Hypervisors 202 and 204 can facilitate resource management for clusters 210 and 220, respectively.

Upon launching, hypervisor 202 can configure ESC 206 to generate an extended memory space 218 (e.g., a logical space) for cluster 210. ESC 206 can map the physical memory space of cluster 210 into the lower cluster addresses of memory space 218. For example, if the local memory unit of cluster 210 includes N memory blocks, the N blocks of the physical memory space can be mapped to cluster addresses 0 to N of memory space 218. Therefore, the memory addresses 0 to N of extended memory space 218 can correspond to the physical memory addresses of cluster 210. To support the mapping of remote memory segments, memory space 218 can support M cluster memory addresses where M can be significantly larger than N. Similarly, hypervisor 204 can configure ESC 208 to generate an extended memory space 228 for cluster 220. ESC 208 can map the physical memory space of cluster 220 into the lower addresses of memory space 228. Global VMs 232 and 234 can then operate on DCS 200. Hypervisors 202 and 204 can allocate computing and memory resources for global VMs 232 and 234.

In this example, global VM 232 can run on the processors of clusters 210 and 220 while using the memory unit of clusters 210 and 220. Accordingly, virtual memory space 240 of global VM 232 can be supported by the physical memories of clusters 210 and 220. The memory of global VM 232 can start at virtual address 0 and can be contiguous over memory space 240. To facilitate access to virtual memory space 240, it can be mapped to the extended memory space of clusters 110 and 120. For example, virtual memory segments 242 and 244 in virtual memory space 240 can be supported by physical memory segments 212 and 222 of clusters 210 and 220, respectively. However, global VM 232 can run on both clusters 210 and 220. Hence, processors 216 and 226 may need to access memory segments 244 and 242, respectively, which are memory segments in remote clusters.

When guest processor 236 of global VM 232 operates on processor 216, it may need to access memory segment 222 of cluster 220. Similarly, when guest processor 236 operates on processor 226, it may need to access memory segment 212 of cluster 210. To facilitate access to memory segment 222, hypervisor 202 can instruct ESC 206 on cluster 210 to map the physical memory addresses of memory segment 222 into a mapped memory segment 214 (e.g., an arbitrary location) of memory space 218. The ESC of cluster 210 can facilitate the visibility of memory segment 222 at cluster 210. When guest processor 236 running on processor 216 accesses memory segment 244 with an instruction, hypervisor 202 can translate that instruction to memory segment 214. ESC 206 can then deliver that instruction to processor 226 of cluster 220 to perform the instruction on memory segment 222. In the same way, hypervisor 204 can instruct ESC 208 on cluster 220 to map the physical memory addresses of memory segment 212 into a mapped memory segment 224 of memory space 228 to allow local access from processor 226.

Since virtual memory space 240 can be mapped to both extended memory spaces 218 and 228, hypervisors 202 and 204 can maintain their respective local mappings for virtual memory space 240. Accordingly, hypervisor 202 can first map virtual memory segments 242 and 244 to memory segments 212 and 214 of memory space 218. Memory segment 214 is mapped by ESC 206 to memory segment 222 of cluster 220. In the same way, hypervisor 204 can map virtual memory segments 242 and 244 to memory segments 222 and 224 of memory space 228, respectively. ESC 208 can then maintain another level of mapping between memory segments 224 and 212. The two-level mapping at each cluster, which are provided by the hypervisor and ESC, respectively, allows guest processor 236 to execute on virtual memory space 240 on both clusters 210 and 220. In other words, the same virtual memory space 240 is supported by both clusters 210 and 220. Therefore, virtual memory space 240 can be accessed by guest processor 236 regardless of which cluster it physically executes on.

Figure 2B:
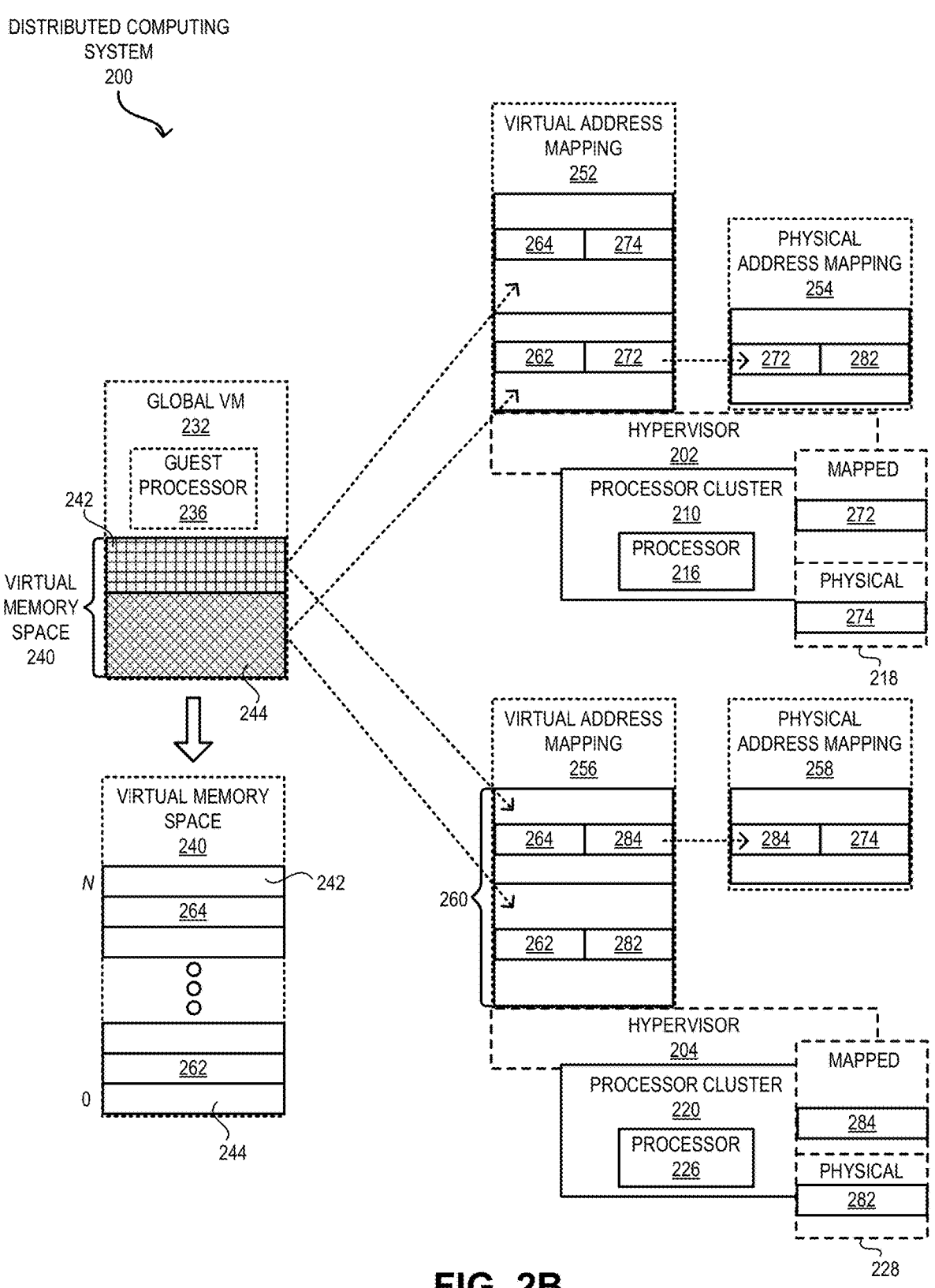
FIG. 2B illustrates an example of memory mappings for accessing a virtual address of a global VM running on a scalable distributed system, in accordance with an aspect of the present application.

FIG. 2B illustrates an example of memory mappings for accessing a virtual address of a global VM running on a scalable distributed system, in accordance with an aspect of the present application. Suppose that virtual memory space 240 includes virtual memory blocks 262 and 264 in virtual memory segments 244 and 242, respectively. Hence, the contents of memory blocks 262 and 264 can be physically stored in physical memories of clusters 220 and 210, respectively. Accordingly, memory blocks 262 and 264 can be stored in cluster memory block 282 of cluster 220 and memory block 274 of cluster 210, respectively. However, memory block 282 can be mapped to cluster memory block 272 of extended memory space 218, and memory block 274 can be mapped to cluster memory block 284 of extended memory space 228. To ensure access to virtual memory segments 244 and 242, both cluster 210 and 220 can maintain a two-level mapping.

Hypervisor 202 can maintain a virtual address mapping 252 (e.g., in a data structure, such as a table) and a physical address mapping 254 (e.g., in the same or a different data structure). A respective entry of mapping 252 can map a virtual memory address, which may identify a virtual memory block, to a cluster memory address of extended memory 218. If the cluster memory address is a mapped address, physical address mapping 254 can map the cluster memory address to a corresponding physical address of a remote cluster. For example, mapping 254 can map virtual memory blocks 262 and 264 to cluster memory blocks 272 and 274, respectively, of extended memory space 218. Since cluster memory block 272 is a mapped memory block, mapping 256 can map cluster memory block 272 to physical memory address 282 of cluster 210.

Similarly, hypervisor 204 can maintain a virtual address mapping 256 and a physical address mapping 258. A respective entry of mapping 256 can map a virtual memory address to a cluster memory address of extended memory 228. If the cluster memory address is a mapped address, physical address mapping 258 can map the cluster memory address to a corresponding physical address of a remote cluster. For example, mapping 256 can map virtual memory blocks 262 and 264 to cluster memory blocks 282 and 284, respectively, of extended memory space 228. Since cluster memory block 284 is a mapped memory block, mapping 256 can map cluster memory block 284 to physical memory address 274 of cluster 220.

If guest processor 236 accesses memory block 264 on processor 216, hypervisor 202 can determine the corresponding cluster memory block 274 from mapping 252. Cluster memory block 274 can correspond to a local physical memory block where the cluster and physical memory addresses can be the same. The access operation can then be performed on the physical memory block. On the other hand, if guest processor 236 accesses memory block 262 on processor 216, hypervisor 202 can determine the corresponding cluster memory block 272 from mapping 252.

The access can be for a transaction on virtual memory block 264. The transaction can be a read or write operation directed to virtual memory block 264. Cluster memory block 272 can correspond to a remote physical memory block 282 of cluster 210, which can be translated by hypervisor 202 from mapping 254. ESC 206 can then deliver that transaction to processor 226 to perform the transaction on memory block 282.

On the other hand, if guest processor 236 accesses memory block 262 on processor 226, hypervisor 204 can determine the corresponding cluster memory block 282 from mapping 256. Cluster memory block 282 can correspond to a local physical memory block where the cluster and physical memory addresses can be the same. The access operation can then be performed on the physical memory block. On the other hand, if guest processor 236 accesses memory block 264 on processor 216, hypervisor 204 can determine the corresponding cluster memory block 284 from mapping 256. Cluster memory block 284 can correspond to a remote physical memory block 274 of cluster 220, which can be translated by hypervisor 204 from mapping 258. ESC 208 can then deliver that transaction to processor 216 to perform the transaction on memory block 274. In this way, virtual memory blocks 262 and 264 can be accessed by guest processor 236 regardless of which cluster it physically executes on.

Figure 3:
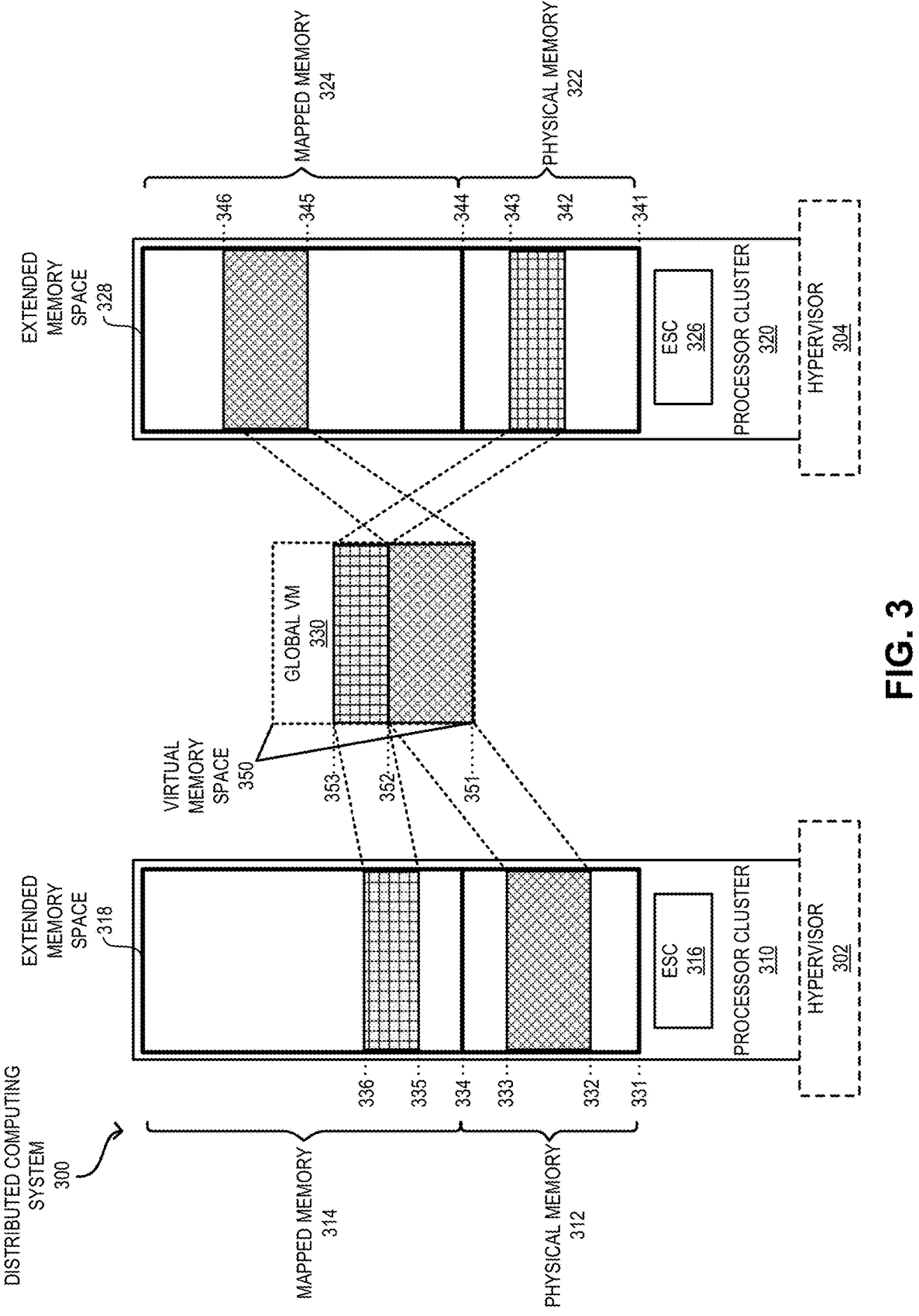
FIG. 3 illustrates an example of the memory allocation for a global VM running on a scalable distributed system, in accordance with an aspect of the present application.

FIG. 3 illustrates an example of the memory allocation for a global VM running on a scalable distributed system, in accordance with an aspect of the present application. A plurality of processor clusters 310 and 320 can be coupled to each other to form a large-scale DCS 300. Each of clusters 310 and 320 can include a plurality of processors. Furthermore, clusters 310 can 320 can include ESCs 316 and 326. Upon independently booting up, clusters 310 and 320 can run hypervisors 302 and 304, respectively. Hypervisors 302 and 304 can facilitate resource management for clusters 310 and 320, respectively. Upon launching, hypervisors 302 and 304 can instruct ESC 316 and 326, respectively, to generate extended memory space 318 and 328, respectively.

ESC 316 can map the physical memory space of cluster 310 into the lower cluster addresses of memory space 318. Similarly, ESC 326 can map the physical memory space of cluster 320 into the lower addresses of memory space 328. To operate global VM 330 in DCS 300, hypervisors 302 and 304 can determine, in conjunction with each other, the memory allocation for global VM 330. Suppose that cluster addresses 331 to 334 of memory space 318 correspond to physical memory 312 of cluster 310. Hence, addresses 331 to 334 can be physical memory addresses. A subset of physical memory 312 from addresses 332 to address 333 can be allocated for global VM 330. Similarly, cluster addresses 341 to 344 of memory space 328 correspond to physical memory 322 of cluster 320, and hence, addresses 331 to 334 can be physical memory addresses. A subset of physical memory 322 from address 342 to address 343 can be allocated for global VM 330.

Accordingly, to determine virtual address space 350 of global VM 330, hypervisors 302 and 304 can first determine that the initial virtual address 351 of virtual address space 350 is address 0. The memory from cluster 310 can then be mapped to virtual address space 350 of global VM 330 at the lowest available addresses, which can be between virtual addresses 351 and 352. Therefore, virtual addresses 351 to 352 can be mapped to addresses 332 to address 333, respectively, of physical memory 312. Hence, virtual addresses 351 to 352 can be determined as address 351 to (address 351+ (address 333−address 332)), respectively. Subsequently, the memory from cluster 320 can then be mapped to virtual address space 350 at the lowest available addresses, which can be between virtual addresses 352 and 353. Therefore, virtual addresses 352 to 353 can be mapped to addresses 342 to address 343, respectively, of physical memory 322. Hence, virtual addresses 352 to 353 can be determined as addresses 352 to (address 352+ (address 343−address 342)), respectively.

Once virtual address space 350 is available, hypervisors 302 and 304 can independently implement the memory mappings for global VM 330. Hypervisor 302 can determine that the range from virtual addresses 351 through 352 is implemented in local physical memory 312 but the range from virtual addresses 352 through 353 is implemented in remote physical memory 322. Therefore, hypervisor 302 can use ESCs 316 and 326 to map the memory on cluster 320 from addresses 342 through 343 to cluster addresses 334 through 336 on mapped memory 314 of memory space 318. Hypervisor 302 can then establish the virtual address mapping that can map virtual addresses 351 to 352 to cluster addresses 332 through 333, respectively, which are local physical addresses. The virtual address mapping can also map virtual addresses 352 to 353 to cluster addresses 335 through 336, respectively, which are mapped addresses corresponding to physical addresses 342 through 343, respectively.

Similarly, hypervisor 304 can determine that the range from virtual addresses 351 through 352 is implemented in remote physical memory 312 but the range from virtual addresses 352 through 353 is implemented in local physical memory 322. Therefore, hypervisor 304 can use ESCs 316 and 326 to map the memory on cluster 310 from addresses 332 through 333 to cluster addresses 345 through 346 on mapped memory 324 of memory space 328. Hypervisor 304 can then establish the virtual address mapping that can map virtual addresses 351 to 352 to cluster addresses 345 through 346, respectively, which are mapped addresses corresponding to physical addresses 332 through 333, respectively. The virtual address mapping can also map virtual addresses 352 to 353 to cluster addresses 342 through 343, respectively, which are local physical addresses. When virtual memory space 350 is mapped on all clusters, virtual memory space 350 can be used to boot a standard guest OS.

Hypervisors 302 and 304 can use a sequencing mechanism to determine the sequence of clusters for mapping to virtual memory space 350. In this example, the sequence of clusters can be (cluster 310, cluster 320) where the physical memory of cluster 310 is mapped first. Examples of the sequencing mechanism can include, but are not limited to, cluster-identifier based (e.g., lowest or highest identifier value first), allocated memory size based (e.g., largest or smallest allocated memory first), and random selection. Mappings for I/O and processing resources required for global VM 230 can be calculated similarly.

Figure 4A:
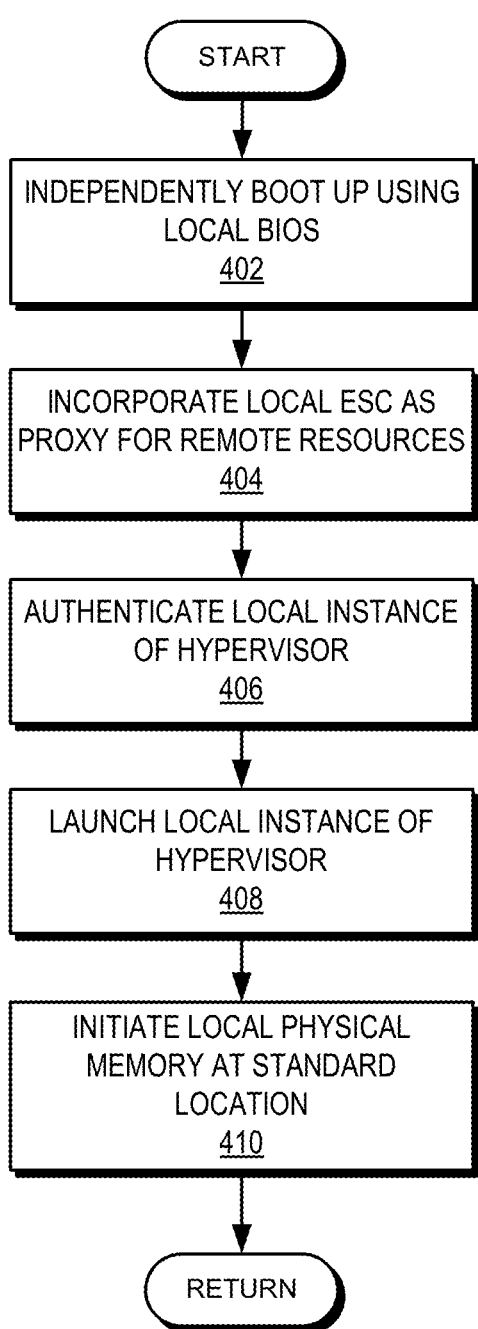
FIG. 4A presents a flowchart illustrating the process of a processor cluster booting up in a scalable distributed system, in accordance with an aspect of the present application.

FIG. 4A presents a flowchart illustrating the process of a processor cluster booting up in a scalable distributed system, in accordance with an aspect of the present application. During operation, the cluster can independently boot up using the local BIOS (operation 402). The cluster can then incorporate the local ESC as the proxy for remote resources (operation 404). Subsequently, the cluster can authenticate a local instance of a hypervisor (operation 406) and launch the hypervisor (operation 408). The cluster can also initiate the local physical memory at the standard location (operation 410). The initiation can include mapping the local physical memory to the lower addresses of the extended memory space of the cluster. As a result, a respective memory block of the physical memory can have the same physical address and cluster address.

Figure 4B:
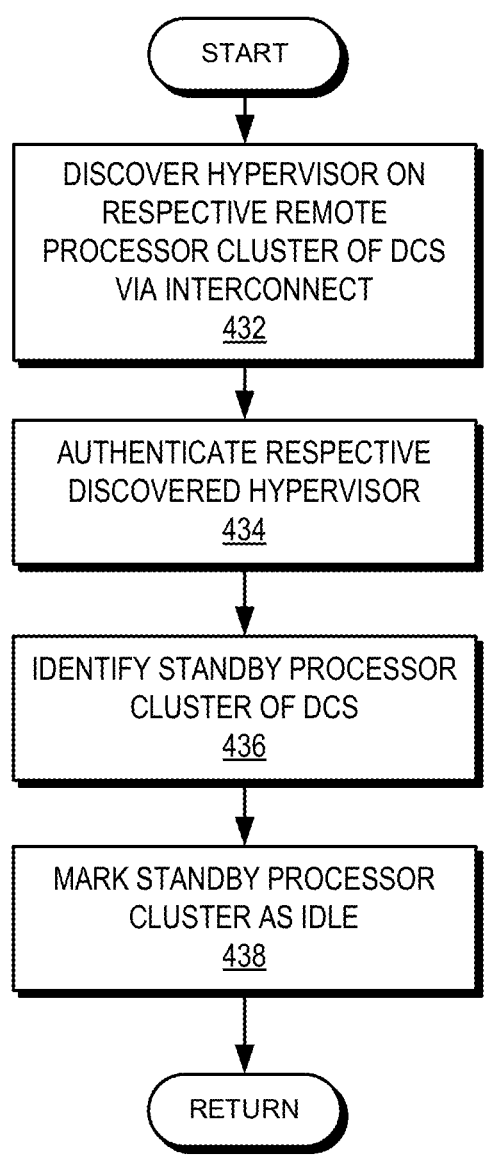
FIG. 4B presents a flowchart illustrating the process of a hypervisor of a processor cluster discovering other hypervisors of a scalable distributed system, in accordance with an aspect of the present application.

FIG. 4B presents a flowchart illustrating the process of a hypervisor of a processor cluster discovering other hypervisors of a scalable distributed system, in accordance with an aspect of the present application. During operation, the hypervisor can discover a hypervisor (e.g., a remote hypervisor) on a respective remote processor cluster of a DCS via the interconnect (operation 432). The hypervisor may authenticate a respective discovered hypervisor (operation 434). The hypervisor may also discover a standby processor cluster of the DCS (operation 436) and mark the standby processor cluster as idle (operation 438). The standby cluster can become active if a failover is needed.

Figure 4C:
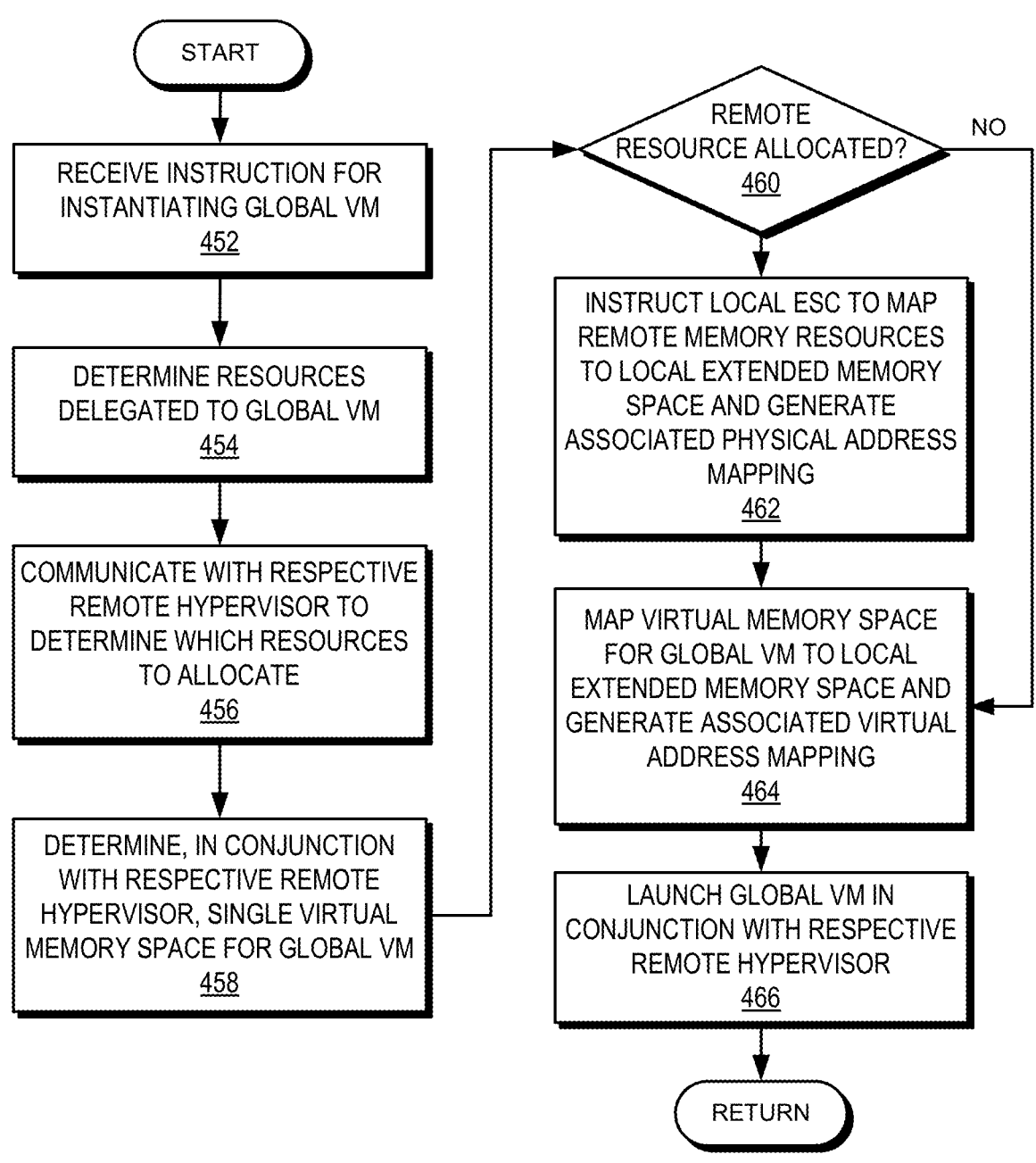
FIG. 4C presents a flowchart illustrating the process of a hypervisor of a processor cluster instantiating a global VM on a scalable distributed system, in accordance with an aspect of the present application.

FIG. 4C presents a flowchart illustrating the process of a hypervisor of a processor cluster instantiating a global VM on a scalable distributed system, in accordance with an aspect of the present application. During operation, the hypervisor can receive an instruction for instantiating the global VM (operation 452) and determine resources delegated to the global VM (operation 454). The hypervisor can communicate with a respective remote hypervisor to determine which resources to allocate (operation 456). The hypervisor can also determine, in conjunction with a respective remote hypervisor, to determine a single virtual memory space for the global VM (operation 458). The hypervisor can then determine whether any remote resource is allocated (operation 460).

If remote resources are allocated, the hypervisor can instruct the local ESC to map the remote memory resources to the local extended memory space and generate the associated physical address mapping (operation 462). On the other hand, if the entire virtual address space is supported by the local cluster, there may not be any remote resources allocated. Upon mapping the remote memory resources (operation 462) or if remote resources are not allocated (operation 460), the hypervisor can map the virtual memory space to the local extended memory space and generate the associated virtual address mapping (operation 464). The hypervisor can then launch the global VM in conjunction with a respective remote hypervisor (operation 466).

Figure 5A:
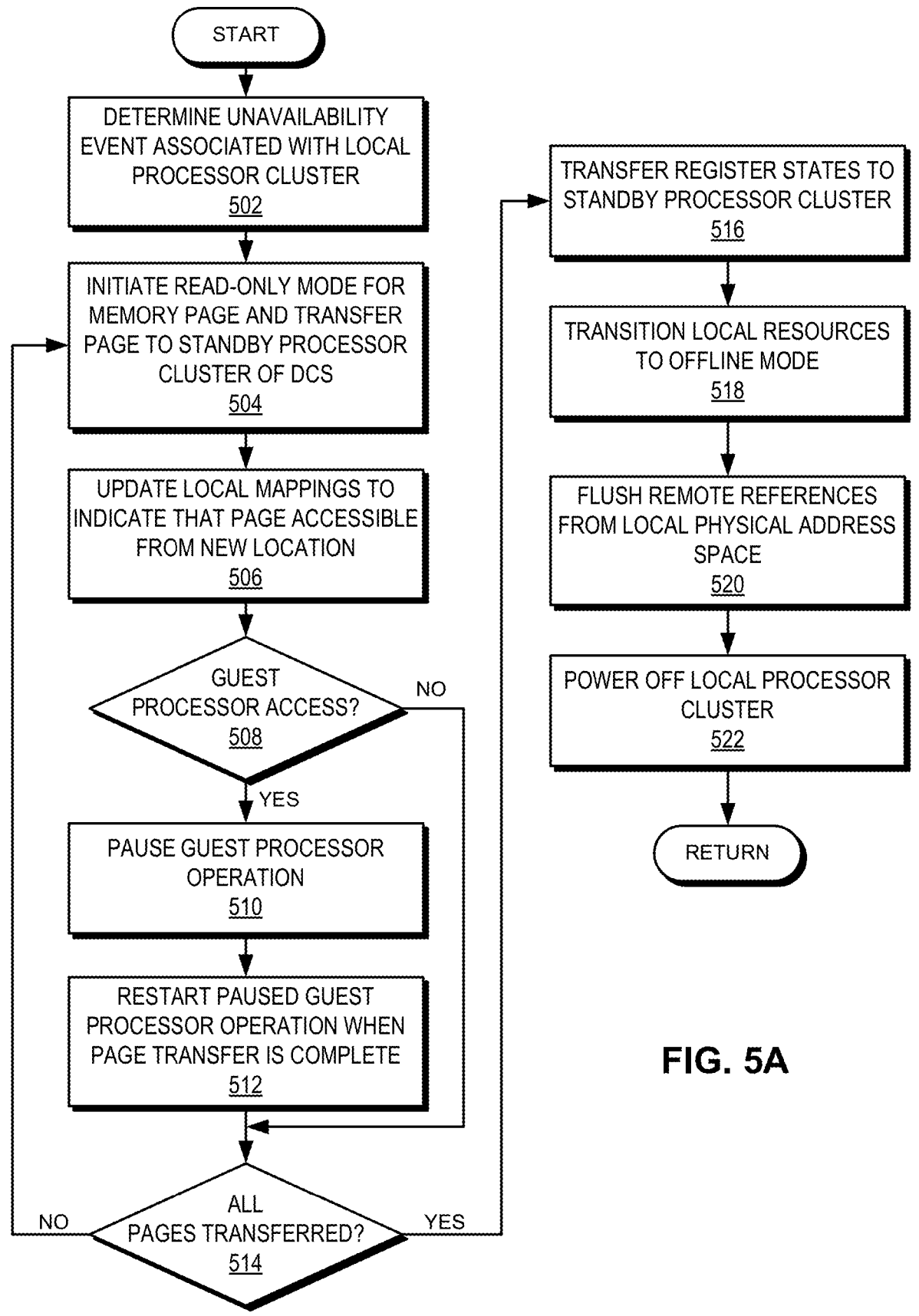
FIG. 5A presents a flowchart illustrating the process of a hypervisor of a processor cluster handing over operations to a standby processor cluster, in accordance with an aspect of the present application.

FIG. 5A presents a flowchart illustrating the process of a hypervisor of a processor cluster handing over operations to a standby processor cluster, in accordance with an aspect of the present application. The hypervisor can determine an unavailability event associated with a local processor cluster (operation 502) (e.g., based on a notification from an analytics system). The hypervisor can then initiate a read-only mode for a memory page and transfer the page to the standby processor cluster of the DCS (operation 504). The hypervisor can also update the local mappings to indicate that the page can be accessible from the new location (operation 506). The hypervisor can then detect whether a guest processor (e.g., from a global VM) has tried to access the page being transferred (operation 508).

If the hypervisor determines a guest processor access, the hypervisor can pause the guest processor operation (operation 510). The hypervisor can restart the paused guest processor operation when the page transfer is complete (operation 512). If the hypervisor does not determine a guest processor access (operation 508) or when the page transfer is complete (operation 512), the hypervisor can determine whether all pages are transferred (operation 514). If all pages are not transferred, the hypervisor can continue to transfer the next page (operation 504).

On the other hand, if all pages are transferred, the hypervisor can transfer the register states to the standby processor cluster (operation 516) and transition local resources to an offline mode (operation 518). The hypervisor can then flush the remote references from the local physical address space (operation 520). The hypervisor can then power off the local processor cluster (operation 522). When the powered-off processor cluster is repaired, the processor cluster can rejoin the DCS as the new standby processor cluster.

Figure 5B:
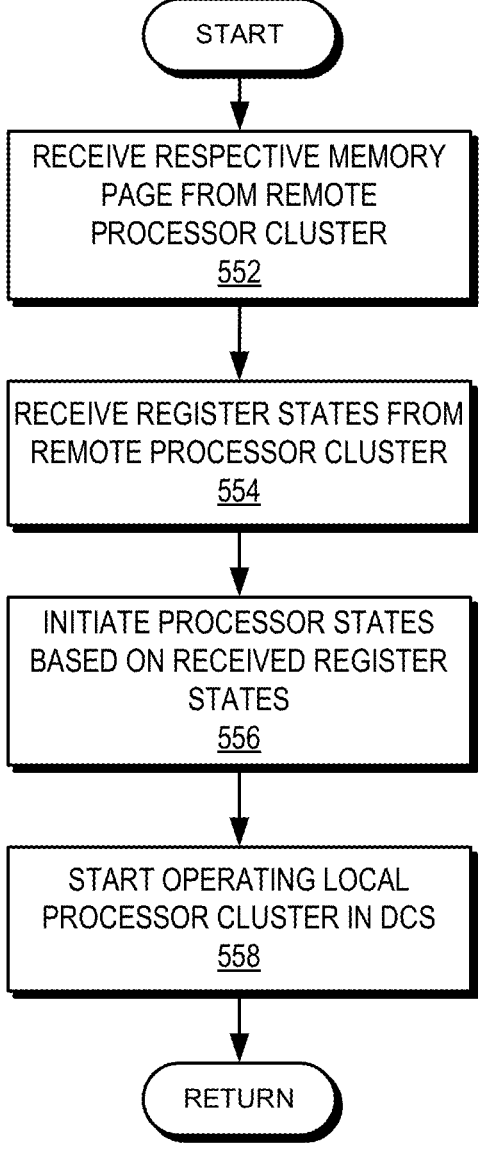
FIG. 5B presents a flowchart illustrating the process of a hypervisor of a standby processor cluster taking over operations of a remote processor cluster, in accordance with an aspect of the present application.

FIG. 5B presents a flowchart illustrating the process of a hypervisor of a standby processor cluster taking over operations of a remote processor cluster, in accordance with an aspect of the present application. During operation, the hypervisor can receive a respective memory page from a remote processor cluster (operation 552). The hypervisor can also receive register states from the remote processor cluster (operation 554). The hypervisor can then initiate the processor states based on the received register states (operation 556) and start operating the local processor cluster in the DCS (operation 558).

Figure 6:
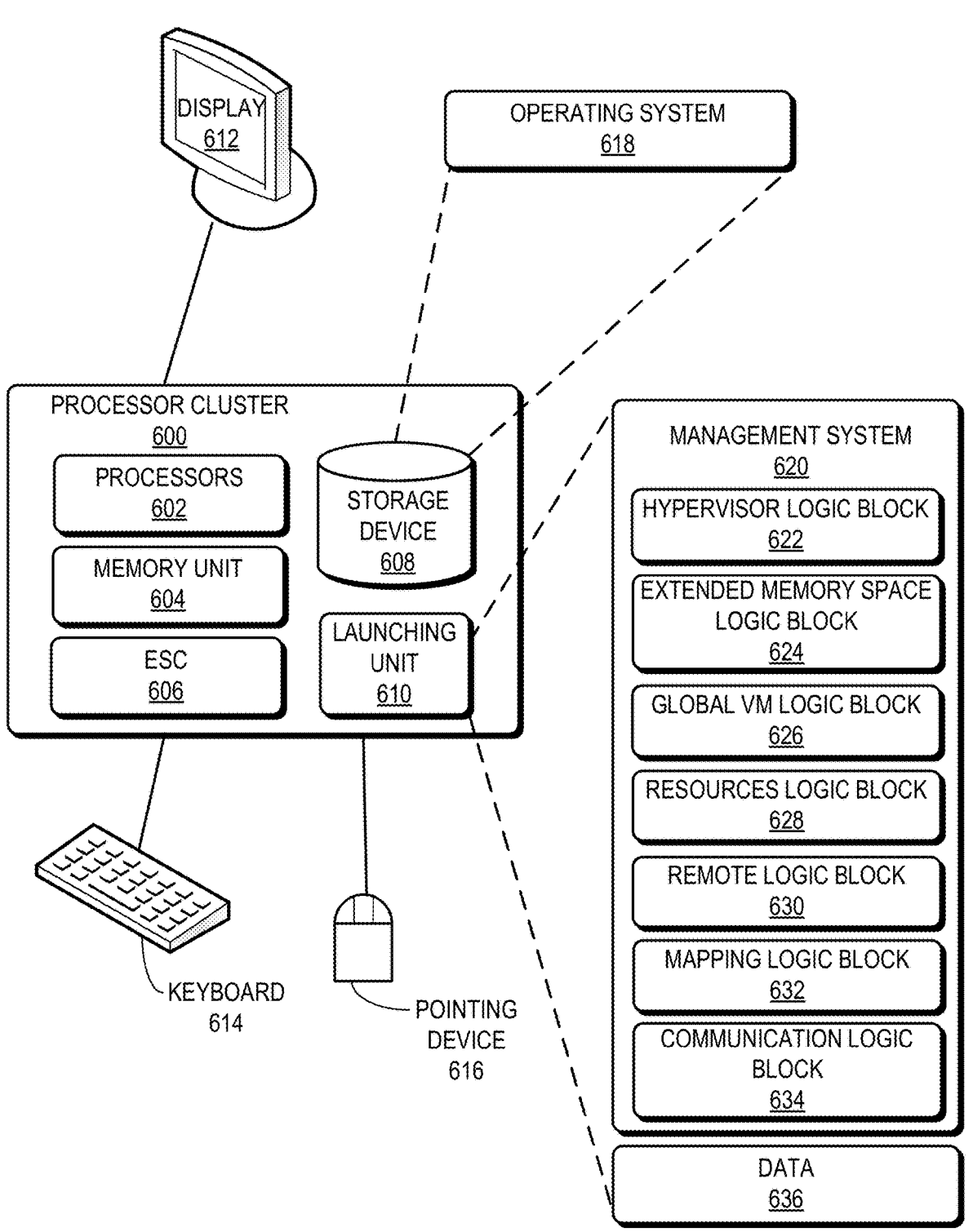
FIG. 6 illustrates an example of a processor cluster in a hypervisor-assisted scalable distributed system, in accordance with an aspect of the present application.

FIG. 6 illustrates an example of a processor cluster in a hypervisor-assisted scalable distributed system, in accordance with an aspect of the present application. A processor cluster 600 includes a set of processors 602, a memory unit 604, an ESC 606, and a storage device 608. Memory unit 604 can include a set of volatile memory devices (e.g., dual in-line memory module (DIMM)). Furthermore, cluster 600 may be coupled to a display device 612, a keyboard 614, and a pointing device 616, if needed. Storage device 608 can store an operating system 618. A launching unit 610, which can be the BIOS, of cluster 600 can store and instantiate a management system 620 and data 636 associated with management system 620. Management system 620 can allow processor cluster 600 to form a DCS with another processor cluster.

Management system 620 can include instructions, which when executed by system 600 can cause system 600 to perform methods and/or processes described in this disclosure. Specifically, management system 620 can include instructions for storing and launching a hypervisor that can operate in conjunction with ESC 606 to incorporate resources of remote clusters (hypervisor logic block 622). Furthermore, management system 620 can include instructions for generating an extended memory space for cluster 600 (extended memory space logic block 624). The extended memory space can incorporate memory unit 604 at standard physical addresses.

Management system 620 can also include instructions for instantiating a global VM capable of running on a set of clusters that includes cluster 600 (global VM logic block 626). In particular, management system 620 can include instructions for determining resources for the global VM (resources logic block 628). Management system 620 can also include instructions for determining the virtual address space for the global VM (resources logic block 628). Moreover, management system 620 can include instructions for mapping remote memory segments allocated to the global VM to the local extended memory space (remote logic block 630).

Management system 620 can further include instructions for generating virtual address mappings and physical address mappings for the global VM (mapping logic block 632). Management system 620 may further include instructions for sending and receiving messages (communication logic block 634). Data 636 can include any data that can facilitate the operations of management system 620. Data 636 can include, but are not limited to, extended address spaces, virtual address spaces, virtual and physical address mappings, and information associated with a respective global VM.

Figure 7:
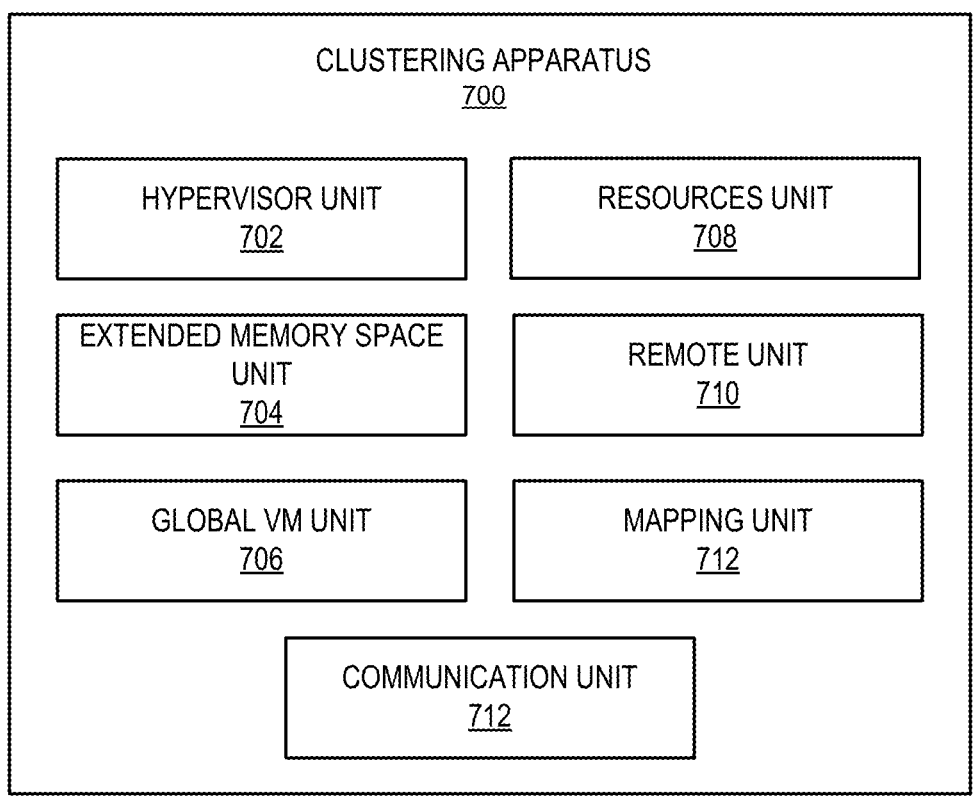
FIG. 7 illustrates an example of an apparatus that facilitates a hypervisor-assisted scalable distributed system, in accordance with an aspect of the present application.

FIG. 7 illustrates an example of an apparatus that facilitates a hypervisor-assisted scalable distributed system, in accordance with an aspect of the present application. Clustering apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-712, which perform functions or operations similar to logic blocks 622-634 of management system 620 of FIG. 6, including: a hypervisor unit 702; an extended memory space unit 704, a global VM unit 706; a resources unit 708; a remote unit 710; a mapping unit 710; and a communication unit 712.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a system for facilitating a first hypervisor running on a first processor cluster. During operation, the first hypervisor can determine a first set of processing nodes and a first memory unit of the first processor cluster in response to the booting up of a first Basic Input/Output System (BIOS) of the first processor cluster. The first hypervisor can discover a second hypervisor running on a second processor cluster comprising a second set of processing nodes and a second memory unit. Subsequently, the first hypervisor can operate, in conjunction with the second hypervisor, a distributed computing system comprising the first and second sets of processing nodes and the first and second memory units. The first hypervisor can then operate, in conjunction with the second hypervisor, a global virtual machine on the distributed computing system. The virtual memory space of the global virtual machine can be mapped to a first memory space and a second memory space of the first and second processor clusters, respectively.

In a variation on this aspect, the first BIOS can boot up independently of a second BIOS of the second processor cluster booting up.

In a variation on this aspect, the first hypervisor can discover the second hypervisor by determining the presence of the second hypervisor via a first extension card of the first processor cluster. The first extension card can be coupled to a second extension card of the second processor cluster via an interconnect of the distributed computing system.

In a further variation, the first extension card can include one of: an external node controller (XNC), a set of Compute Express Links (CXLs) to an external shared memory unit, and an input/output (I/O) Hub (IOH).

In a further variation, the first hypervisor can determine, at the first processor cluster, an operation on a virtual memory address of the global virtual machine. The first extension card can then determine that the virtual memory address corresponds to a physical memory address of the second memory unit and send the operation to the second memory unit.

In a further variation, the first hypervisor can determine that a first virtual segment and a second virtual segment of the virtual memory space correspond to a first physical segment of the first memory unit and a second physical segment of the second memory unit, respectively. The first memory space can include a first physical memory space of the first memory unit and a first mapped memory space of the second physical segment. Similarly, the second memory space can include a second physical memory space of the second memory unit and a second mapped memory space of the first physical segment.

In a further variation, the first hypervisor can generate a first mapping between the virtual memory space and a first subset of the first memory space. The first subset can include the first physical memory space and the first mapped memory space. The first extension card can also generate a second mapping between the first mapped memory space and the second physical memory space.

In a variation on this aspect, the first hypervisor can be authenticated with the first BIOS.

In a variation on this aspect, the distributed computing system can also include a third processor cluster operating as a standby cluster. Here, the third processor cluster can remain idle and include a third set of processing nodes and a third memory unit.

In a further variation, the first hypervisor can determine an instruction indicating unavailability of the first processor cluster. The first hypervisor can then transfer the memory pages of the first memory unit to the third memory unit via an interconnect coupling the first and third processor clusters.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   determining, by a first hypervisor running on a first processor cluster, a first set of processing nodes and a first memory unit of the first processor cluster in response to booting up of a first Basic Input/Output System (BIOS) of the first processor cluster;
   discovering, by the first hypervisor, a second hypervisor running on a second processor cluster comprising a second set of processing nodes and a second memory unit;

forming, by the first hypervisor in conjunction with the second hypervisor, a distributed computing system comprising the first and second sets of processing nodes and the first and second memory units;

operating, based on execution of a resource management mechanism for controlling communications between the first hypervisor and the second hypervisor to allocate computing and memory resources, a global virtual machine on the distributed computing system, wherein a virtual memory space of the global virtual machine is mapped to a first memory space and a second memory space of the first and second processor clusters, respectively, wherein the allocated resources are used by the global virtual machine to perform an operation between a processor of the first set of processing nodes and a processor of the second set of processing nodes in the virtual memory space of the global virtual machine:

determining, at the first processing cluster, the operation on a virtual memory address of the global virtual machine;

determining, by a first extension card, that the virtual memory address corresponds to a physical memory address of the second memory unit; and sending, by the first extension card, the operation to the second memory unit.

2. The method of claim 1, wherein the first BIOS boots up independently of a second BIOS of the second processor cluster booting up.

3. The method of claim 1, wherein discovering the second hypervisor further comprises determining presence of the second hypervisor via the first extension card of the first processor cluster, wherein the first extension card is coupled to a second extension card of the second processor cluster via an interconnect of the distributed computing system.

4. The method of claim 3, wherein the first extension card includes one of:

an external node controller (XNC);

a set of Compute Express Links (CXLs) to an external shared memory unit; and an input/output (I/O) Hub (IOH).

5. The method of claim 3, further comprising determining that a first virtual segment and a second virtual segment of the virtual memory space correspond to a first physical segment of the first memory unit and a second physical segment of the second memory unit, respectively;

wherein the first memory space includes a first physical memory space of the first memory unit and a first mapped memory space of the second physical segment; and wherein the second memory space includes a second physical memory space of the second memory unit and a second mapped memory space of the first physical segment.

6. The method of claim 5, further comprising:

generating, by the first hypervisor, a first mapping between the virtual memory space and a first subset of the first memory space, wherein the first subset includes the first physical memory space and the first mapped memory space; and generating, by the first extension card, a second mapping between the first mapped memory space and the second physical memory space.

7. The method of claim 1, wherein the distributed computing system further comprises a third processor cluster operating as a standby cluster, wherein the third processor cluster remains idle and includes a third set of processing nodes and a third memory unit.

8. The method of claim 7, further comprising:

determining an instruction indicating unavailability of the first processor cluster; and transferring memory pages of the first memory unit to the third memory unit via an interconnect coupling the first and third processor clusters.

9. A non-transitory computer-readable storage medium storing instructions that when executed by a processor of a first processor cluster cause the processor to perform a method, the method comprising:

determining, by a first hypervisor running on the first processor cluster, a first set of processing nodes and a first memory unit of the first processor cluster in response to booting up of a first Basic Input/Output System (BIOS) of the first processor cluster;

discovering, by the first hypervisor, a second hypervisor running on a second processor cluster comprising a second set of processing nodes and a second memory unit;

forming, by the first hypervisor in conjunction with the second hypervisor, a distributed computing system comprising the first and second sets of processing nodes and the first and second memory units;

operating, based on execution of a resource management mechanism for controlling communications between the first hypervisor and the second hypervisor to allocate computing and memory resources, a global virtual machine on the distributed computing system, wherein a virtual memory space of the global virtual machine is mapped to a first memory space and a second memory space of the first and second processor clusters, respectively, wherein the allocated resources are used by the global virtual machine to perform an operation between a processor of the first set of processing nodes and a processor of the second set of processing nodes in the virtual memory space of the global virtual machine;

determining, at the first processor cluster, the operation on a virtual memory address of the global virtual machine;

determining, by a first extension cad, that the virtual memory address corresponds to a physical memory address of the second memory unit; and sending, by the first extension card, the operation to the second memory unit.

10. The non-transitory computer-readable storage medium of claim 9, wherein the first BIOS boots up independently of a second BIOS of the second processor cluster booting up.

11. The non-transitory computer-readable storage medium of claim 9, wherein discovering the second hypervisor further comprises determining presence of the second hypervisor via the first extension card of the first processor cluster, wherein the first extension card is coupled to a second extension card of the second processor cluster via an interconnect of the distributed computing system.

12. The non-transitory computer-readable storage medium of claim 11, wherein the first extension card includes one of:

an external node controller (XNC);

a set of Compute Express Links (CXLs) to an external shared memory unit; and an input/output (I/O) Hub (IOH).

13. The non-transitory computer-readable storage medium of claim 11, wherein the method further comprises determining that a first virtual segment and a second virtual segment of the virtual memory space correspond to a first physical segment of the first memory unit and a second physical segment of the second memory unit, respectively;

wherein the first memory space includes a first physical memory space of the first memory unit and a first mapped memory space of the second physical segment; and wherein the second memory space includes a second physical memory space of the second memory unit and a second mapped memory space of the first physical segment.

14. The non-transitory computer-readable storage medium of claim 13, wherein the method further comprises:

generating, by the first hypervisor, a first mapping between the virtual memory space and a first subset of the first memory space, wherein the first subset includes the first physical memory space and the first mapped memory space; and generating, by the first extension card, a second mapping between the first mapped memory space and the second physical memory space.

15. The non-transitory computer-readable storage medium of claim 9, wherein the distributed computing system further comprises a third processor cluster operating as a standby cluster, wherein the third processor cluster remains idle and includes a third set of processing nodes and a third memory unit.

16. The non-transitory computer-readable storage medium of claim 15, wherein the method further comprises:

determining an instruction indicating unavailability of the first processor cluster; and transferring memory pages of the first memory unit to the third memory unit via an interconnect coupling the first and third processor clusters.

17. A processor cluster, comprising:

a plurality of processors;

a memory device; and control circuitry to facilitate a hypervisor logic block, a management logic block, and a global virtual machine logic block;

the hypervisor logic block to:

run a first hypervisor on the processor cluster to determine a first set of processing nodes and a first memory unit of the processor cluster in response to booting up of a first Basic Input/Output System (BIOS) of the processor cluster; and discover a second hypervisor running on a remote processor cluster comprising a second set of processing nodes and a second memory unit;

a management logic block to form a distributed computing system comprising the first and second sets of processing nodes and the first and second memory units; and a global virtual machine logic block to operate, based on execution of a resource management mechanism for controlling communications between the first hypervisor and the second hypervisor to allocate computing and memory resources, a global virtual machine on the distributed computing system, wherein a virtual memory space of the global virtual machine is mapped to a first memory space and a second memory space of the processor cluster and the second processor cluster, respectively, wherein the allocated resources are used by the global virtual machine to perform an operation between a processor of the first set of processing nodes and a processor of the second set of processing nodes in the virtual memory space of the global virtual machine;

determine the operation on a virtual memory address of the global virtual machine;

determine, by a first extension card, that the virtual memory address corresponds to a physical memory address of the second memory unit; and send, by the first extension card, the operation to the second memory unit.

18. The processor cluster of claim 17, wherein discovering the second hypervisor further comprises determining presence of the second hypervisor via the first extension card of the processor cluster, wherein the first extension card is coupled to a second extension card of the remote processor cluster via an interconnect of the distributed computing system.

19. The method of claim 1, wherein the resource management mechanism includes round-robin allocation, load-based allocation, and pre-configured allocation.

20. The non-transitory computer-readable storage medium of claim 9, wherein the resource management mechanism includes round-robin allocation, load-based allocation, and pre-configured allocation.

* * * * *